Patented Dec. 5, 1944

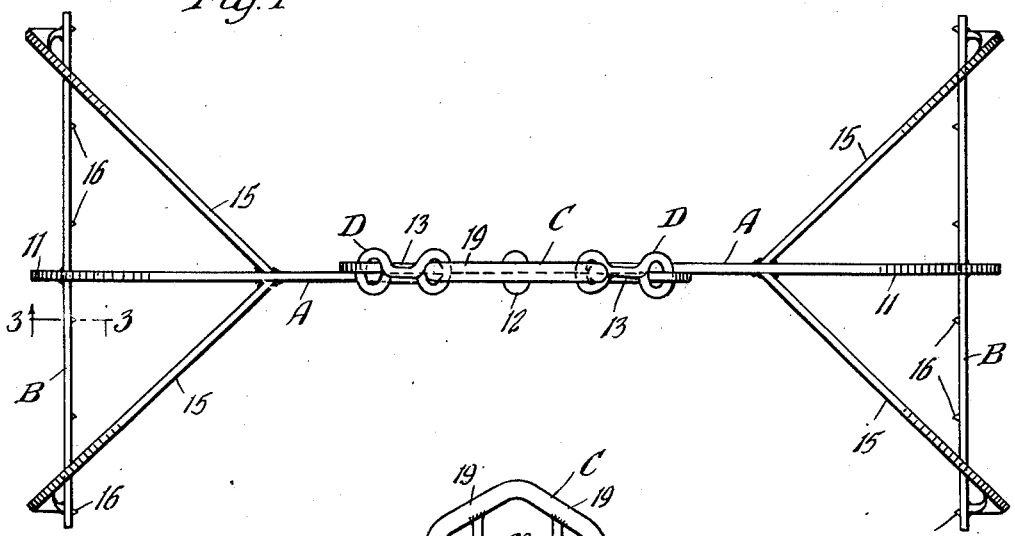
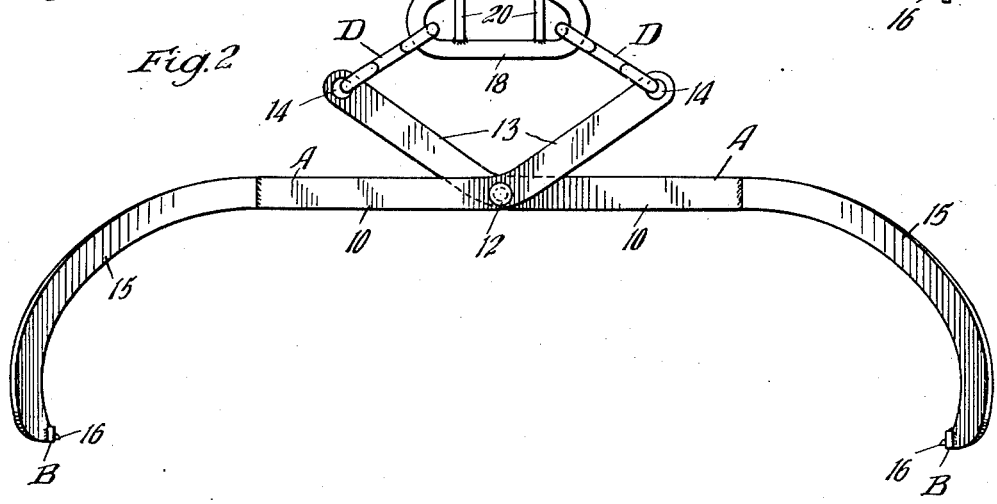
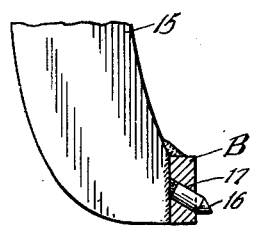

2,364,316

UNITED STATES PATENT OFFICE 2,364,316

GRAPPLING HOOK

Robert R. Royal and Frank F. Hayes, Paducah, Ky., Ralph E. Berggren, Chicago, Ill., and James B. Temple, Paducah, Ky.

Application February 7, 1944, Serial No. 521,323

2 Claims. (Cl. 294—106)

This invention relates to improvements in grappling hooks for handling filled bags.

One object of the invention is to provide a crane-operated grappling hook especially designed to lift bags filled with sugar.

A more specific object of the invention is to provide a grappling hook having a pair of pivoted arms, each arm having a transversely extending gripping jaw at its outer end in the form of an elongated flat bar provided at intervals with projecting points on the inner side thereof to effectively grip and hold the bag without danger of tearing or ripping the same.

A still further object of the invention is to provide a grappling hook, as set forth in the preceding paragrph, wherein the elongated barlike gripping jaws are braced by reinforcing members, extending diagonally between the arms and the outer ends of the bars forming the jaws of the grappling hook.

Other objects of the invention will more clearly appear from the description and claims hereinafter following.

In the drawing forming a part of this specification, Figure 1 is a top plan view of our improved grappling hook. Figure 2 is a side elevational view of Figure 1, looking upwardly in said figure. Figure 3 is a transverse sectional view, on an enlarged scale, corresponding substantially to the line 3—3 of Figure 1 of the jaw member and associated parts at the left hand side of the grappling hook, as illustrated in Figure 1.

Our improved grappling hook, as illustrated in the drawing, comprises broadly a pair of pivotally connected arms A—A; transverse barlike jaws B—B at the outer ends of the arms; an eye member C; and connecting links D—D between the eye member C and the inner ends of the arms A—A.

Each arm A is in the form of an elongated bar of rectangular cross section having a substantially straight portion 10 and a curved hook-shaped outer end portion 11. The bars forming the arms A—A are pivotally connected to each other at their inner end portions by a rivet or pin 12 extending through suitable transverse pivot openings in said bars. Each bar terminates at its inner end beyond the pivot thereof in an angularly upstanding portion or relatively short lever arm 13. As will be evident, the straight portion 10 of the arm, together with the hook-shaped portion 11, forms a relatively long lever arm. Each lever arm 13 is provided with an opening 14 at its outer end.

The jaws B—B are of similar design, each jaw comprising an elongated bar of angular cross section at right angles to the length of the bar A and fixed to the inturned end of the extremity of the curved hook portion 11 of said bar A, being preferably welded thereto. The ends of the bar B are connected to the main body portion of the corresponding arm A by diagonal braces 15—15 extending between the straight section 10 of the arm A and said bar B, being preferably welded to said arm and bar. The braces 15—15 are in the form of bars of rectangular cross section and are curved to correspond with the curved end portion 11 of the corresponding bar or arm A.

Each jaw B has a plurality of projecting points 16—16 on the inner side thereof. The points 16—16 are in the form of short, downwardly inclined pins welded in openings 17—17 of the jaw B, as shown most clearly in Figure 3.

The eye member C is in the form of a broadly triangular ring comprising a horizontal lower section 18 and upwardly inclined upper sections 19—19 connected by rounded portions. The eye C is braced by vertical webs 20—20 extending between the section 18 and sections 19—19.

The links D—D connect the inner ends of the short arm portions 13—13 of the arms A—A to the eye member C, each link having eye portions at opposite ends thereof engaged respectively through the eye C and the opening 14 of the arm portion 13 of the corresponding bar A.

The points 16—16 which project from the inner sides of the bars B—B are relatively short, so that the bags when gripped between the flat surfaces of the jaws B—B will not be perforated, but merely gripped by the points 16—16, the points only slightly indenting the bags, so that slippage with respect to the jaws is prevented.

Our improved grappling hook is employed with the usual traveling crane of the motor truck type, having a hook which is engaged through the eye C to lift and lower the grappling hook.

Our improved grappling hook is employed to lift filled sugar bags from a pile and deposit them on a pallet, one at a time, in a stack, comprising a plurality of superimposed layers of two bags each, with the bags of each layer arranged side by side lengthwise.

The operation of our improved grappling hook is as follows: To pick up a bag, the hook is lowered over the bag so that the length of the bag is parallel to the gripping jaws B—B with the jaws at opposite sides of the bag in embracing relation thereto. As the grappling hook is lowered over the bag by the crane, the jaws will automatically be opened, in the usual manner, due to the horizontal sections 10 of the arms A coming in contact with the upper side of the bag and resting thereon. After the jaws have been opened, the grappling hook is lifted by the upward pulling action of the crane-operated hook, which is engaged through the eye C. This upward pull on the eye closes the jaws through the toggle action of the links D—D and short arms 13—13 of the arms A—A of the grappling hook, thereby clamping the bag tightly between the jaws so that it may be conveyed by the crane to the desired place of deposit, preferably a pallet on which the bags are to be stacked. When the bag is lowered by the crane upon the pallet or another bag on said pallet, the jaws automatically open when the bag comes to rest on the pallet or bag upon the pallet, as is usual in the operation of grappling hooks.

We have herein shown and described what we now consider the preferred manner of carrying out our invention, but the same is merely illustrative and we contemplate all changes and modifications that come within the scope of the claims appended hereto.

We claim:

1. In a grappling hook, the combination with two pivotally connected arms, each arm having short and long lever arm portions; of an elongated barlike jaws at the outer end of each arm transversely thereof and projecting at opposite sides of said arm, said jaws of said two arms being opposed and parallel; and diagonal bracing bars extending from each arm to the opposite outer ends of each barlike jaw and fixed to the latter and said arm.

2. In a grappling hook, the combination with two pivotally connected arms; of opposed, parallel, elongated bars fixed to the outer ends of said arms, said bars forming gripping jaws; and a plurality of downwardly inclined gripping points projecting from the inner sides of said jaw forming bars.

R. R. ROYAL.
FRANK F. HAYES.
RALPH E. BERGGREN.
J. B. TEMPLE.